United States Patent [19]
Forster et al.

[11] 3,818,060
[45] June 18, 1974

[54] PRODUCTION OF CARBOXYLIC ACIDS

[75] Inventors: Denis Forster, University City; Arnold Hershman, St. Louis, both of Mo.

[73] Assignee: Monsanto Company, St. Louis, Mo.

[22] Filed: July 26, 1971

[21] Appl. No.: 166,238

[52] U.S. Cl. .................. 260/413, 203/99, 252/437, 260/533 A
[51] Int. Cl. ............................................ C08h 17/36
[58] Field of Search ...................... 260/413, 533 AN

[56] References Cited
UNITED STATES PATENTS
3,505,394  4/1970  Olivier ........................ 260/533 AN
3,579,552  5/1971  Craddock et al. .................. 260/413
3,657,368  4/1972  Parshall ...................... 260/533 AN

*Primary Examiner*—Lewis Gotts
*Assistant Examiner*—Ethel G. Love

[57] ABSTRACT

Production of carboxylic acids by carboxylation of ethylenically unsaturated compounds utilizing a stabilized catalyst system comprising a rhodium or iridium compound, a halide promoter and as a stabilizer an organic derivative of pentavalent phosphorus, arsenic, antimony, nitrogen or bismuth.

20 Claims, No Drawings

PRODUCTION OF CARBOXYLIC ACIDS

This invention relates to an improved process for the preparation of carboxylic acids. More particularly, it relates to improved stabilized catalyst compositions for the reaction of ethylenically unsaturated compounds with carbon monoxide and water to yield carboxylic acids. More specifically, the said improved catalyst compositions are essentially comprised of iridium or rhodium compounds or complexes, halide promoters, and a catalyst stabilizer component comprising an organic derivative of pentavalent phosphorus, arsenic, antimony, nitrogen or bismuth.

Processes for the preparation of carboxylic acids from olefins, and other ethylenically unsaturated compounds, carbon monoxide and water are well known in the art and have been directed to the production of carboxylic acids and ester derivatives. The prior art teaches the use of a number of catalysts for the synthesis of carboxylic acids by reaction of olefins with carbon monoxide and water at elevated temperatures and pressures. Catalysts such as boric, arsenic and monochloroacetic acids; acetyl chloride on active carbon; boron trifluoride; barium and calcium halides; salts and carbonyls of nickel and cobalt, especially halides; and in general, the Group VIII metals, and simple salts, carbonyls and complexes; have been reported to function for the production of carboxylic acids and esters by reaction of olefins and carbon monoxide in the presence of water or other hydroxylic compounds at temperatures from 130°C – 375°C and pressures up to 1,000 atmospheres.

Certain disadvantages present in the carboxylation processes described in the prior art are catalyst instability, lack of product selectivity, and low levels of catalyst reactivity. A serious problem which is prevalent with metal complex catalysts described in the prior art is that while being soluble and stable under the conditions normally present under reaction synthesis conditions, the said catalysts frequently decompose and deposit unreactive, insoluble metal compounds under conditions which exist during processing steps and the subsequent isolation of the desired carboxylic acid products, for example, by distillation, vacuum distillation, vacuum filtration, high temperature crystallization, etc. In addition, these prior art catalyst systems frequently decompose to inactive residues if the conditions in the reactor are upset, for example by carbon monoxide deficiency, resulting from a control failure. Such limitations present in the catalyst systems described in the prior art for production of carboxylic acids result in a short catalyst life and serious problems in recycling the catalyst from the area of the process equipment used for the separation of the product to the area of the process equipment used for the actual synthesis reaction which employs the metal component as the catalyst. These problems lead to costly techniques for recovering these highly expensive metal compounds, and seriously detract from the usefulness of the catalyst systems in processes described in the prior art.

Certain complexes or compounds of Group VIII metals containing a trivalent derivative of Group VA elements as ligands described in the prior art for use as carboxylation catalysts either with or without a halide promoter may display good stability when subjected to such operations as distillation. However, a serious disadvantage of such complexes is that the rate of reaction is markedly decreased when said complexes containing trivalent derivatives of Group VA elements as ligands are used when compared with the same systems in the presence of added pentavalent Group VA stabilizers of the present invention.

Quite unexpectedly, we have found that addition of pentavalent derivatives of phosphorus, arsenic, antimony, nitrogen and bismuth, to the Group VIII metal compounds discussed herein results in catalyst systems which are very stable against precipitation or solids deposition, under a wide variety of operating conditions and, in addition, exhibit high reactivity and long catalyst life.

In accordance with the present invention, ethylenically unsaturated compounds are preferably converted selectively to carboxylic acids by reaction in the liquid phase with carbon monoxide and water at temperatures from about 50°C to 300°C, preferably 125°C to 225°C and at partial pressures of carbon monoxide from 1 psia to 15,000 psia, preferably 5 psia to 3,000 psia in the presence of an improved catalyst system comprised of an iridium or rhodium containing compound, a promoter portion, i.e., a halide and a stabilizer component, i.e., an organic derivative of pentavalent phosphorus, arsenic, antimony, nitrogen or bismuth such as organic phosphine oxides and sulfides, arsine oxides and sulfides, stibine oxides, amine oxides and bismuth oxides.

As referred to above, for the purpose of the present invention, the improved catalyst system as charged to the reactor contains essentially an iridium or rhodium component, a halide or halogen promoter, and the said pentavalent derivatives of Group VA elements as stabilizers. The catalyst system essentially includes an iridium or rhodium compound or complex as the active component. This active catalytic portion or first component of the catalyst system is prepared from iridium or rhodium species such as the metals, simple iridium or rhodium salts, organoiridium or organorhodium compounds, and coordination compounds of iridium and rhodium, examples of which are shown in the following partial list of suitable compounds.

Ir metal
Rh metal
$IrCl_3$
$RhCl_3$
$IrBr_3$
$RhBr_3$
$IrI_3$
$RhI_3$
$IrCl_3 \cdot 3H_2O$
$RhCl_3 \cdot 3H_2O$
$Ir_2(CO)_4Cl_2$
$Rh_2(CO)_4Cl_2$
$Ir[(C_6H_5)_3P]_2(CO)I$
$Rh[(C_6H_5)_3P]_2(CO)Cl$
$[n^-(C_4H_9)_4N][Ir(CO)_2X_2]$ where $X = Cl^-, Br^-, I^-$
$[n^-(C_4H_9)_4N][Rh(CO)_2X_2]$ where $X = Cl^-, Br^-, I^-$
$IrBr[(C_6H_5)_3P]_3$
$RhBr[(C_6H_5)_3P]_3$
$IrO_2$
$Rh_2O_3$ The term compound or coordination complex used throughout this specification means a compound or complex formed by combination of one or more electronically rich molecules or atoms capable of independent existence with one or more electronically poor molecules or atoms, each of which may also be capable of independent existence.

The promoter essentially includes a halide or halogen component selected from the group consisting of chloride, bromide and iodide and may be provided by a hydrogen halide, alkyl halide having from one to 30 carbon atoms, free halogen, etc. Of this group bromide and iodide are preferred and iodide is espeicially preferred as the halide promoter. Although any ratio of promoter portion may be employed, ratios of promoter portion to active metal portion expressed as atoms of halogen promoter portion to atoms of iridium or rhodium in the active portion of the catalytic system in the range of 1:1 to 2500:1 are generally employed. However, the preferred range is 3:1 to 300:1 halogen atoms per metal atom.

The improved catalyst systems of the present invention specifically make use of stabilizers to prevent precipitation. As employed herein, precipitation or solids deposition is defined as separation from the reaction system of crystalline or amorphous solid phases which contain the metal as such or as insoluble compounds of the metal.

The stabilizer component is essentially comprised of an organic derivative of pentavalent phosphorus, arsenic, antimony, nitrogen or bismuth, such as triethylphosphine oxide, triphenylphosphine oxide, trioctylphosphine sulfide, trimethylarsine oxide, tritolylstibine oxide or trimethylamine oxide. Mixed organo derivatives such as alkylarylarsine oxides and condensed polymeric phosphine oxides and sulfides may also be employed. The mono-, di- and tri-substituted compounds may be used. Examples of preferred stabilizers are illustrated by the following structural formulae and examples.

a. $R_3MZ$ where M = P, As, Sb, N, or Bi and
   R = hydrogen or an alkyl radical having from one to 18 carbon atoms or an aryl radical having from six to 18 carbon atoms, and
   Z = O or S b.

where M = P, As, Sb, N, or Bi and
   R = hydrogen or an alkyl radical having from one to 18 carbon atoms or an aryl radical having from six to 18 carbon atoms and
   n = 0 to 18.
   Z = O or S c. RZ where Z = O or S
   R is a heterocyclic compound containing pentavalent phosphorus, arsenic, antimony or nitrogen. Examples of such stabilizers include pyridine oxide, phosphabenzene oxide, etc.

General method for the preparation of the present stabilizers are found in "Organo Phosphorus Compounds" (G. M. Kosolapoff (1950) and "Organic Syntheses", Volume 30 by R. L. Shriner and C. M. Woolf, page 97ff (1950).

Although any ratio of stabilizer portion may be employed, ratios of stabilizer portion to active portion expressed as molecules of stabilizer to atoms of metal in the active portion of the catalyst system in the range of 0.1:1 to 1000:1 are generally employed. However, the preferred range is 1:1 to 100:1 stabilizer molecules per metal atom.

The liquid reaction medium employed with the said improved catalyst system may be any solvent compatible with the improved catalyst system and may include pure olefins or saturated or unsaturated hydrocarbons, e.g., pentane, butylenes, benzene, decane, eiocosane, etc. Mixtures thereof with the desired carboxylic acid and/or other carboxylic acids such as nonanoic acid may be used. A preferred solvent component and liquid reaction medium for the process of this invention is a monocarboxylic acid having two to 20 carbon atoms, e.g., acetic, propionic, hexanoic, decanoic, dodecanoic, naphthoic, oleic and elaidic acids, including isomeric forms. Water may optionally be added to the reaction mixture in excess of the stoichiometric quantity discussed below.

The present invention is based upon the production of carboxylic acids by the transformation of an ethylenically unsaturated compound, having from two to 30 carbon atoms, and containing the structural unit

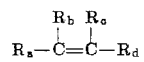

in heterocyclic, heteroaliphatic, aliphatic acyclic, cyclic or polycyclic hydrocarbon form, where $R_a$, $R_b$, $R_c$ and $R_d$ are moieties having from 0 to 20 carbon atoms and being selected from the group consisting of hydrogen, halogen, alkyl, alkene, aryl, cycloalkyl and cycloalkene moieties. The said heterocompounds may also be substituted with nitrogen, phosphorus, sulfur, halogen, or oxygen atoms.

Suitable feedstocks in the process of this invention are any ethylenically unsaturated compounds. Suitable compounds include ethylene, propylene, butene-1; butene-2; hexenes, octenes; dodecenes; hexadecene, 2-methylpropene; 1,3-butadiene; 2-methyl-1,3,-butadiene; 2,3-dimethyl-1,3-butadiene; cyclohexene; methyl-cyclohexene; styrene; methylstyrene; vinylcyclohexene; 3,3-di-methyl-1-butene; 1,4-hexodiene; 2,4-hexadiene; 1,5-hexadiene; 2-methyl-1,4-hexadiene; acrolein; methyl vinyl ketone; allyl alcohol; 2-phenylbutene; cyclopentadiene; 2-cyclohexylbutene; allene; allylamine; diallylamine; acrylonitrile; methyl acrylate; vinyl chloride; phosphopyruvic acid; and mixtures thereof.

Other suitable feedstocks include compounds having cyclic and polycyclic structures containing, in part, an ethylenically unsaturated linkage which may be converted to a carboxylic acid by the process of this invention. Examples of suitable cyclic structures include 1,5-cyclooctadiene; 1,5,9-cyclododecatriene; furan; 1,2-dithiol and pyrrole. Preferred ethylenically unsaturated feedstocks include ethylene to produce propionic acid; olefins having from three to eight carbon atoms to produce carboxylic acids having from four to nine carbon atoms; and olefins having from nine to 19 carbon atoms to produce carboxylic acids having from 10 to 20 carbon atoms.

A typical carboxylation reaction selective to carboxylic acid requires at least one mole of carbon monoxide and one mole of water per mole (equivalent) of ethlenically unsaturated linkage reacted. An excess of carbon monoxide and water over the aforesaid stoichiometric amounts, however, may be present. Carbon monoxide streams containing inert impurities such as carbon dioxide, methane, nitrogen, noble gases and paraffinic hydrocarbons having from one to four carbon atoms, may be employed, if desired, for example from an available plant gas stream, with no ill effect; however, in such cases total reactor pressure may have to be increased to maintain a desired carbon monoxide partial pressure. The concentration of carbon monoxide in the feed gas mixture is from 1 vol percent to 99.9 vol percent, a preferred range being from 10 vol percent to 99.9 vol percent.

The reaction rate is dependent upon catalyst concentration and temperature. Concentrations of the metal compound or the first component of the catalyst system in the liquid phase, between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The concentration of the second component or promoter portion of the catalyst system may vary widely over the broad concentration range of $10^{-6}$ moles/liter to 18 moles/liter, based on halogen atom. In the process of this invention, however, the preferred concentration range of promoter is $10^{-4}$ moles/liter to 2 moles/liter of catalyst solution.

The concentration of the third component or stabilizer portion of the catalyst system may vary widely over the broad range of $10^{-6}$ moles/liter to 18 moles/liter. However, the preferred concentration range of stabilizer is $10^{-4}$ moles/liter to 2 moles/liter of catalyst solution.

The active, stabilized, improved catalytic system is preferably supplied as a catalyst solution. The solution can also include liquid reactants, products and mixtures thereof which function as solvents or reaction media.

In the production of carboxylic acids, the ethylenically unsaturated feedstock is normally charged with equimolar amounts of water, although more water may optionally be used. The use of ethylenically unsaturated linkage compounds in the above ratios is on the basis that at least a molar quantity of water is present equivalent to the number of moles of ethylenically unsaturated linkage reacted.

The promoting portion or second component of the improved catalyst system as discussed herein consists of halide and may be supplied as the free halogen or halogen compound such as hydrogen halide, alkyl- or aryl-halide, metal halide, ammonium, phosphonium, arsonium, stibonium halide, etc., and may be the same or different from any halogen component already present in the precursor metal component of the catalyst system. Although any halide or halogen compound may be used, bromide and iodide are the preferred halogen component with iodide being especially preferred.

The above promoter portion or second component of the catalyst may alternatively be charged to the reactor separately from the active catalyst or first component, or it may be incorporated into the active component, e.g., $RhBr_3$, $[Rh(CO)_2I]_2$, $Ir(CO)_3I_3$ or $IrCl_3$.

The stabilizing portion or third component of the catalyst system as discussed herein is comprised of an organic derivative of pentavalent phosphorus, arsenic, antimony, nitrogen or bismuth and may be supplied directly to the reaction mixture as a preformed pentavalent compound such as a trialkyl or triaryl phosphine oxide or trialkyl or triarylarsine oxide. Alternatively, the stabilizer component may be generated in situ in the reactor initially under oxidizing conditions. The hydrocarboxylation reaction is subsequently carried out under reducing conditions. For example, the said pentavalent Group V stabilizer component may be provided by a precursor supplied to the reactor as a trivalent derivative of P, As, Sb, N, or Bi together with an oxidizing agent. For example, a simple triorganophosphine or arsine or a precursor metal complex containing a triorganophosphine, arsine or stibine ligand, e.g., $Rh(P\phi_3)_2COCl$, $Ir[(n-C_4H_9)_3As]_2COCl$, etc. may be employed together with an oxidizing agent such as hydrogen peroxide or ozone. The initial trivalent organo Group VA derivative is thus converted to a pentavalent derivative and under carboxylation reaction conditions gives equivalent results to those obtained when the triorgano pentavalent Group VA oxide is used directly.

The preparation of the improved, active catalyst system which includes (1) Ir or Rh metal or compounds thereof, (2) halide promoter, and (3) stabilizer components may be accomplished by a variety of methods. For example, to prepare the catalyst system, the first component of the catalyst system, e.g., finely divided iridium or rhodium metal (powder), a simple compound or complex thereof, as a precursor is dissolved in a suitable medium, and carbon monoxide is bubbled through the above iridium or rhodium solution, preferably while maintaining gentle heating and stirring of the solution. Then an acidic solution of the desired promoter source is added to form an active catalytic solution. At this time, or before the carbon monoxide addition, the stabilizer component is added to the solution either dissolved in the same solvent or as a liquid or solid directly.

This catalyst solution containing the necessary metal or its compound, the promoter, and stabilizer components is then ready for use as discussed above, and may be employed as a liquid phase or vapor phase catalyst.

As another embodiment of the invention, carboxylic acids may be produced if desired via reaction of ethylenically unsaturated compounds with carbon monoxide and water in the vapor phase over the improved stabilized iridium or rhodium containing catalyst systems described above, dispersed upon inert supports. Such a catalyst system may be operated as a conventional fixed bed catalytic reactor. For example, ethylene, aqueous hydrogen iodide, and carbon monoxide may be passed over a catalyst system consisting, for example, of $[Ir(CO)_2Cl]_2$ and a pentavalent stabilizer such as trioctylstibine oxide, dispersed on an inert support material such as alundum, activated carbon, clays, alumina, silica-alumina, and ceramics, etc., in a fixed bed reactor maintained at elevated temperature and pressure, as described above, to produce propionic acid in high yields. However, use of a liquid reaction medium is preferred in the process of this invention using dissolved or dispersed active catalytic promoter and stabilizer components.

The ultimate nature of the catalyst as modified by reaction conditions, and the presence of promoters, stabilizers, and reactants has not been completely elucidated. However, it has been found that the use of the components described herein provides a highly superior catalyst and process for the production of carboxylic acids.

The three component catalyst system of the present invention is characterized by a high degree of stability combined with a very high reactivity, a combination which has not been achieved with any catalyst system described in the prior art for production of carboxylic acids. The catalyst systems described herein are stable and maintain high reactivity even under high vacuum conditions whereas the systems described in the prior art are susceptible to catalyst precipitation under such conditions which result in a much reduced catalyst life and overall reactivity As an example of the improved reactivity achieved by the present three component catalyst system it is found that the carboxylation of ethylene to propionic acid can be conducted at about 100 times as great a productivity per gram of noble metal using the combination catalyst of:
  iridium chloride
  hydrogen iodide
  tributylphosphine oxide
relative to the equivalent proportions of
  iridium chloride
  hydrogen iodide
  tributyl phosphine It has been found that when the previously known iridium and rhodium catalysts were used as homogeneous catalysts the metals can be precipitated as insoluble compounds when the reaction products are subjected to separation procedures such as distillation at elevated temperatures. This difficulty has been found to be particularly acute with carbonyl complexes which are subject to the loss of the carbon monoxide ligand, and resultant precipitation of noble metal in the form of the metal per se, as halides or as other insoluble compound forms. The problem of precipitation of the metal catalyst is further accentuated when a distillation is conducted under vacuum conditions, as is essential for instance in the separation of higher carboxylic acids, e.g., those having from three to 30 carbon atoms from the liquid catalytic mixture.

It has also been found that the employment of the above specific stabilizers in the catalyst solutions of iridium or rhodium components makes it possible to overcome the difficulties of precipitation such as have been encountered heretofore. The use of a precipitation inhibiting proportion of the aforesaid stabilizer, e.g., a combination of 0.01 mole/liter of triphenylphosphine oxide in the catalyst solution overcomes such precipitation difficulties.

In another embodiment it has also been found that the present pentavalent Group VA stabilizers provide distillation-stable catalyst combinations of the iridium or rhodium compounds or complexes together with a halogen. The catalyst combination may thus be recycled after the removal by distillation of the volatile products, e.g., carboxylic acids and unreacted olefin. It is noteworthy that the present stabilizers do not deleteriously affect the carboxylation reaction in which olefin is reacted with carbon monoxide to obtain acids and/or esters. In contrast to such action of the present stabilizer such as phosphine oxide, it is found that similarly substituted phosphines badly inhibit the carboxylation reaction.

For a better understanding of the process of the present invention specific embodiments of the invention are presented below. These examples and illustrations are not to be construed in any way as limiting the scope of the invention.

EXAMPLE 1

A batch reactor is charged with the following ingredients: 0.180 grams ($5 \times 10^{-4}$ moles) of an iridium compound having the formula $IrCl_3 \cdot 4H_2O$, as catalyst precursor; 0.9 ml (0.005 moles) of a promoter component consisting of 47 wt. percent aqueous hydrogen iodide; 41 ml of glacial acetic acid as solvent and 7.3 ml $H_2O$ as reactant; and 50 ml (0.4 moles) of hexene-1 having the structural formula $H_2C=CH(CH_2)_3CH_3$ as feedstock. The ratio of I/Ir is 10:1. The charge also includes 0.96 gm ($2.5 \times 10^{-3}$ moles) trioctylphosphine oxide as a stabilizer.

The reactor is pressurized with carbon monoxide to a total pressure of 700 psig, (partial press of CO about 600 psi) at 195°C. The reaction is carried out at constant pressure by feeding CO to maintain pressure, from a high pressure reservoir. Reaction time is 3 hours.

The reaction mixture subsequently analyzed by gas chromatographic technique, yields a solution containing
  2.3 wt. percent unreacted hexene
  0.6 wt. percent miscellaneous intermediates including iodides
  51.4 wt. percent acetic acid solvent
  45.7 wt. percent heptanoic acids.

Upon completion of the carboxylation reaction, the product is subjected to a distillation separation. The distillation is conducted under a pressure of 100 mm in the distillation vessel.

When the distillation is conducted at 100 mm pressure at the bioiling point of the heptanoic acids (approximately 150°C and also up to 210°C) no precipitation of any metal or metal compound occurs. In comparison, when no trioctylphosphine oxide stabilizer is present it is found that a dark brown solid is precipitated during the distillation. This dark brown material is isolated and shown to contain iridium.

In general, the proportion of the organic phosphine oxide (or arsenic oxide, antimony oxide or amine oxide or bismuth oxide) which is employed in the practice of the present invention is from $10^{-6}$ to 18 moles/liter, or preferably $10^{-4}$ to 2 moles/liter of catalyst solution.

In addition to preventing precipitation, the stabilized catalyst system exhibits no deleterious effect on reactivity and product selectivity.

EXAMPLE 2

When the above process is conducted with 0.97 gm of trioctylphosphine (and in another test with 0.95 gm of triphenylphosphine instead of the phosphine oxide), it is found in each instance that the reaction is inhibited to the point that less than 1/100 of the yield of Example 1 is obtained.

EXAMPLE 3

A batch reactor is charged with the following ingredients: 0.132 grams ($5 \times 10^{-4}$ moles) of an iridium compound having the formula $Ir_4(CO)_{12}$, as catalyst precursor; 0.9 ml (0.005 moles) of a promoter consisting of 47 wt. percent aqueous hydriodic acid; 41 ml of nonanoic acid as solvent; 7.3 ml of water as a reactant; and 50 ml (0.16 moles) of heptadecene-1 as feedstock. The ratio of I/Ir is 10/1. The charge also includes 1.38 gm ($2.5 \times 10^{-3}$ moles) of tridodecylphosphine oxide as a stabilizer.

The reactor is pressurized with carbon monoxide to a total pressure of 700 psig (partial pressure of CO about 600 psi) at 190°C. The reaction is carried out at constant pressure by feeding CO upon demand from a high pressure reservoir. Reaction time is 3 hours.

The reaction mixture subsequently analyzed by a gas chromatographic technique, yields a solution containing 4 wt. percent unreacted heptadecene
5 wt. percent miscellaneous intermediates including iodides and esters
40 wt. percent nonanoic acid solvent
51 wt. percent octadecanoic acids Upon completion of the reaction, the product is subjected to distillation. The distillation is conducted under a pressure of 10 mm at which pressure the octadecanoic acids boil at approximately 200°C. The catalyst is stable and no precipitation of any metal compound occurs. By contrast when no tridodecylphosphine oxide stabilizer is present it is found that a dark brown solid, containing iridium, is precipitated during the distillation.

In general, the preferred proportion of phosphine oxide or other organic oxides or sulfides defined above, which is employed in the practice of the present invention is, on a molar basis, 0.1 to 100 times the molar concentration of the metal compound employed as the catalyst.

EXAMPLE 4

A batch reactor is charged with the following ingredients: 0.18 grams ($5 \times 10^{-4}$ moles) of an iridium compound having the formula $IrCl_3 \cdot 4H_2O$, as catalyst precursor; 1.2 gm (0.005 moles) of a promoter consisting of 2-iodooctane; 35 ml of tridecanoic acid as solvent; 4.7 ml of water as a reactant; and 60 ml (0.27 moles) of dodecene as feedstock. The ratio of I/Ir is 10:1. The charge also includes 0.69 gm ($2.5 \times 10^{-3}$ moles) of triphenylphosphine oxide as a stabilizer.

The reactor is pressurized with carbon monoxide to a total pressure of 400 psig (partial pressure of CO about 350 psi) at 185°C. The reaction is carried out at constant pressure by feeding CO upon demand from a high pressure reservoir. Reaction time is 3½ hours.

The reaction mixture subsequently analyzed by a gas chromatographic technique, yields a solution containing 9.5 wt. percent unreacted dodecene
0.6 wt. percent miscellaneous intermediates including iodides
89.9 wt. percent tridecanoic acid Upon completion of the reaction, the product is subjected to distillation. The distillation is conducted under a pressure of 15 mm at which pressure the tridecanoic acids boil at approximately 185°C. The catalyst is stable and no precipitation of any metal compound occurs. By contrast when no triphenylphosphine oxide stabilizer is present it is found that a dark brown solid, containing iridium, is precipitated during the distillation.

After distillation 39 ml of residual liquid is recharged to the batch reactor with a fresh charge of 60 ml dodecene, 1.2 g 2-iodooctene and 4.7 ml water. The reaction is carried out as above with the same carboxylation reactivity. This example demonstrates the ability to recycle the improved, stabilized catalyst system with no precipitation in the reactor or during processing and no loss of reactivity.

In another experiment changing the triphenylphosphine oxide stabilizer to trioctylphosphine oxide the catalyst system is recycled over 40 times through the reaction-distillation combination with no precipitation or reactivity loss. This long life demonstrates that the stabilized catalyst system is applicable to use in a continuous process involving continual reaction, separation and recycle.

EXAMPLE 5

A batch reactor is charged with the following ingredients: 0.13 grams ($5 \times 10^{-4}$ moles) of a rhodium compound having the formula $RhCl_3 \cdot 3H_2O$, as catalyst precursor; 9.0 ml (0.05 moles) of a promoter consisting of 47 wt percent aqueous hydriodic acid; 71 ml of propionic acid as solvent; and 15 g (0.36 moles) of propylene as feedstock. The ratio of I:Rh is 100:1. The charge also includes 0.96 gm ($2.5 \times 10^{-3}$ moles) of trioctylphosphine oxide as a stabilizer.

The reactor is pressurized with carbon monoxide to a total pressure of 1,000 psig (partial pressure of CO about 600 psi) at 185°C. The reaction is carried out at constant pressure by feeding CO upon demand from a high pressure reservoir. Reaction time is 3 hours.

The reaction mixture subsequently analyzed by a gas chromatographic technique, yields a solution containing 2 wt. percent unreacted propylene
25 wt. percent miscellaneous intermediates including iodides
50 wt. percent propionic acid solvent
23 wt. percent butyric acid Upon completion of the reaction, the product is subjected to distillation. The distillation is conducted under atmospheric pressure at which pressure the butyric acids boil at approximately 164°C. The catalyst is stable and no precipitation of any metal compound occurs. In the absence of the stabilizer, a black rhodium containing precipitate is deposited during distillation.

EXAMPLE 6

A batch reactor is charged with the following ingredients: 0.18 grams ($5 \times 10^{-4}$ moles) of an iridium compound having the formula $IrCl_3 \cdot 4_2O$, as catalyst precursors; 0.9 ml (0.005 moles) of a promoter consisting of 47 wt. % aqueous hydriodic acid; 41 ml of nonanoic acid as solvent; 4.1 ml of water as a reactant; and 50 ml (0.226 moles) of dodecene-1 as feedstock. The ratio of I/Ir is 10:1. The charge also includes 0.67 gm ($2.5 \times 10^{-3}$ moles) of tributylarsine oxide as a stabilizer. The reactor is pressurized with carbon monoxide to a total pressure of 700 psig (partial pressure of CO about 600 psi) at 185°C. The reaction is carried out at constant pressure by feeding CO upon demand from a high pressure reservoir. Reaction time is 3 hours.

The reaction mixture subsequently analyzed by a gas chromatographic technique, yields a solution containing 4.0 wt. percent unreacted dodecene
3.0 wt. percent miscellaneous intermediates including iodides and esters
40 wt. percent nonanoic acid solvent
53 wt. percent tridecanoic acids Upon completion of the reaction, the product is subjected to distillation. The distillation is conducted under a pressure of 15 mm at which pressure the tridecanoic acids boil at approximately 185°C. The catalyst is stable and no precipitation of any metal compound occurs. By contrast when no tributylarsine oxide stabilizer is present a dark brown solid containing iridium is precipitated during the distillation.

When this experiment is repeated using equivalent proportions of tributylstibine oxide, tributylamine oxide, or trimethylbismuthine oxide a similar stabilizing effect of the catalyst system is obtained.

EXAMPLE 7

A batch reactor is charged with the following ingredients: 0.18 grams ($5 \times 10^{-4}$ moles) of an iridium compound having the formula $IrCl_3 \cdot 4H_2O$, as catalyst precursor; 0.9 ml (0.005 moles) of a promoter consisting of 47 wt. percent aqueous hydriodic acid; 41 ml of acetic acid as solvent; 7.3 ml of water as a reactant; and 50 ml (0.4 moles) of hexene-1 as feedstock. The ratio of I/Ir is 10:1. The charge also includes 0.96 gm ($2.5 \times 10^{-3}$ moles) of trioctylphosphine oxide as a stabilizer.

The reactor is pressurized with carbon monoxide to a total pressure of 700 psig (partial pressures of CO about 600 psi) at 195°C. The reaction is carried out at constant pressure by feeding upon demand from a high pressure reservoir. Reaction time is 3 hours.

The reaction mixture subsequently analyzed by a gas chromatographic technique, yields a solution containing 2.3 wt. percent unreacted hexene
0.6 wt. percent miscellaneous intermediates including iodides
51.4 wt. percent acetic acid solvent
45.7 wt. percent heptanoic acids Upon completion of the reaction, the product is subjected to distillation. The distillation is conducted under a pressure of 100 mm at which pressure the heptanoic acids boil at approximtely 160°C. The catalyst is stable and no precipitation of any metal compound occurs. The distillation may also be conducted at atmospheric pressure where the heptanoic acids boil at 220° – 230°C and again no precipitation of catalyst occurs. By contrast when no triocytylphosphine oxide stabilizer is present a dark brown iridium-containing composition is precipitated during the distillation.

EXAMPLE 8

A batch reactor is charged with the following ingredients: 0.345 grams ($5 \times 10^{-4}$ moles) of a rhodium compound having the formula $Rh(\phi_3P)_2COCl$, as catalyst precursor; 3.0 ml (0.0275 moles) of a promoter consisting of 48 wt. percent aqueous hydrobromic acid; 70 ml of propionic acid as solvent and 10 ml of water as reactant. The ratio of Br/Rh is 55:1. The above mixture is treated with an oxidizing agent comprised of 10 ml of 30 percent aqueous hydrogen peroxide solution and warmed for 30 min. to convert the trivalent $\phi_3P$ ligands to $\phi_3PO$ which then serves as the stabilizer. The resulting solution is heated under 50 psi of CO for 1 hour.

The reactor is then pressurized with a 50/50 mixture of ethylene and carbon monoxide to a total pressure of 700 psig (partial pressure of CO about 300 psi) at 175°C. The reaction is carried out at constant pressure by feeding the $C_2H_4$/CO mixture upon demand from a high pressure reservoir. Reaction time is 3¼ hours.

The reaction mixture subsequently analyzed by a gas chromatographic technique, yields a solution containing 1.1 wt. percent miscellaneous intermediates including iodides
98.9 wt. percent propionic acid Upon completion of the reaction, the product is subjected to distillation. The distillation is conducted at atmospheric pressure where the propionic acid boils at approximtely 141°C. The catalyst is stable and no precipitation of any metal or metal compound occurs.

This example demonstrates the ability to convert a trivalent Groups VA bound ligand in the metal precursor to an effective pentavalent stabilizer in situ.

EXAMPLE 9

A batch reactor is charged with the following ingredients: 0.250 grams ($1.4 \times 10^{-3}$ mole) of an iridium compound having the formula $IrCl_3 \cdot 4H_2O$, as catalyst precursor; 1.65 grams 2-iodooctane ($1.4 \times 10^{-2}$ moles) as promoter, 65 ml tridecanoic acid as solvent and 2.3 ml $H_2O$ as reactant and 65 ml dodecene (0.29 moles) as feedstock. The ratio of I/Ir is 10:1. The charge also includes 0.5 grams trioctylphosphine. The ratio of trioctylphosphine to Ir is 2:1. Also added is 10 ml of 30 percent aqueous hydrogen peroxide as an oxidizer to oxidize the phosphine to phosphine oxide.

The reactor is pressurized with carbon monoxide to a total pressure of 400 psig at 185°C. The reaction is carried out a constant pressure by feeding CO to maintain pressure from a high pressure reservoir. Reaction time is 80 minutes.

The reaction mixture subsequently analyzed by gas chromatographic technique, yields a solution containing 23.1 wt. percent unreacted dodecene
0.6 percent miscellaneous intermediates including iodides
76.3 percent tridecanoic acid Upon the completion of the reaction the product is subjected to a distillation separation. The distillation is conducted under a pressure of 15 mm at which pressure the tridecanoic acids boil at approximately 185°C. The catalyst is stable and no solid residue is deposited.

As a further test, after distillation 65 ml of residual liquid is recycled to the reactor with a fresh charge of 65 ml dodecene, 1.65 grams 2-iodooctene and 2.3 ml $H_2O$, and 0.5 grams trioctylphosphine is added. In this test no oxidizer is employed to convert the phosphine to phosphine oxide. The reactor is operated as above but the yield is less than 1/100 of that when the hydrogen peroxide is employed as oxidizer to convert the trivalent phosphine to the pentavalent phosphine oxide in situ.

This example again demonstrates the superior reaction rate attained with phosphine oxide versus phosphine and also the utilization of oxidizing agents for conversion of phosphine to phosphine oxide in situ.

EXAMPLE 10

A batch reactor is charged with the following ingredients: 0.180 grams ($5 \times 10^{-4}$ moles) of an iridium compound having the formula $IrCl_3 \cdot 4H_2O$, as catalyst precursor; 0.9 ml (0.005 moles) of a promoter component consisting of 47 wt. percent aqueous hydrogen iodide; 35 ml of tridecanoic acid as solvent; 4.7 of water as a reactant; and 60 ml (0.27 moles) of dodecene as feedstock. The ratio of I/Ir is 10:1. No stabilizer is employed.

The reactor is pressured with carbon monoxide to a total pressure of 400 psig (partial pressure of CO about 350 psi) at 185°C. No additional CO is added to the reactor. This condition simulates a reactor upset in which no CO is fed. The pressure in the reactor drops as the reaction proceeds and after 2½ hours the reactor pressure is 50 psi. When the reaction solution is examined a dark brown solid, containing iridium, is observed.

Stabilizer in the form of 0.96 grams ($2.5 \times 10^{-3}$ moles) of trioctylphosphine oxide is added. The reactor is again pressured to 400 psig and CO and the unreacted dodecene from the above mixture reacts but as above no additional CO is fed. After 2½ hours the reaction pressure is 50 psi. When the reaction solution is examined no precipitate is observed.

This example demonstrates that the stabilizer component not only is effective during separation of catalyst from reaction products but also during operating upsets in the reactor.

EXAMPLE 11

A solid supported catalyst containing an iridium component, an iodide promoter and a phosphine oxide stabilizer component dispersed upon an inert support is prepared in the following manner: An amount of 0.18 grams of an iridium compound having the formula $IrCl_3 \cdot 3H_2O$ and 0.96 grams trioctylphosphine oxide is dissolved in 2-methoxy ethanol. The solution is warmed to 95°C and carbon monoxide is bubbled through the solution for 2 hours. Then the solution is cooled and 13 ml 57 wt. percent hydroiodic acid is added to the solution. Subsequently the resulting solution is added to 20 ml of an activated carbon. The excess solvent is evaporated using a rotary evaporator under vacuum. The resulting catalyst is vacuum dried at 50°C for about 16 hours. The catalyst is then preheated in nitrogen at 200°C for one hour.

Ten ml of the above supported catalyst is charged into an 18-inch Pyrex glass vertical reactor 30 mm in diameter. The resulting catalyst bed, 2 cm. in depth, is covered with 100 ml of inert packing as a preheater. Gaseous ethylene is supplied to the reactor and is subsequently converted to propionic acid at high selectivity. The process is conducted at a feed rate (moles per hour) of ethylene, 0.17; HI, 0.01; water, 0.18; and CO, 0.38. This feed mixture provides the water in a 5.3 percent molar excess relative to olefins. The pressure at which the gaseous reactants contact the supported catalyst is 500 psia, corresponding to a carbon monoxide partial pressure of about 125 psia at a reaction temperature of 195°C.

The gaseous reactor effluent contains the desired carboxylic acid product, propionic acid, and unreacted ethylene, water, carbon monoxide and promoter. The selectivity of ethylene conversion to propionic acid is virtually quantitative.

What is claimed is:

1. In a process for production of carboxylic acids wherein an ethylenically unsaturated hydrocarbon having two to 30 carbon atoms is reacted with carbon monoxide and water at a temperature of 50°C to 300°C, the improvement which comprises contacting the said reactants with a three component catalyst system comprised of an iridium or rhodium compound, a halide promoter, and as a stabilizer, a member of the group consisting of a trialkylphosphine oxide, a triarylphosphine oxide, a trialkylarsine oxide, a triarylarsine oxide, a trialkyl amine oxide and a trialkylstibine oxide.

2. In a process for production of carboxylic acids wherein an ethylenically unsaturated hydrocarbon is reacted with carbon monoxide and water at a temperature of 50°C to 300°C and subsequently separating the product acid by distillation, the improvement which comprises contacting the said reactants with a three component catalyst system comprised of an iridium or rhodium compound, a halide promoter, and as a stabilizer, a member of the group consisting of a trialkylphosphine oxide, a triarylphosphine oxide, a trialkylarsine oxide, a triarylarsine oxide, a trialkyl amine oxide and a trialkylstibine oxide, and thereafter distilling the products and unreacted reactants from the said catalyst system.

3. Process as in claim 2 in which the distillation step is a vacuum distillation.

4. The process as in claim 1 in which the partial pressure of carbon monoxide is from 1 psia to 15,000 psia.

5. A process as in claim 1 in which the iridium component is provided by iridium chloride.

6. A process as in claim 1 in which the rhodium component is provided by rhodium iodide.

7. A process as in claim 1 in which the promoter is provided by hydrogen iodide.

8. A process as in claim 1 in which the promoter is provided by an alkyl iodide.

9. A process as in claim 1 in which the promoter is provided by iodine.

10. In a process for production of carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter, and a trialkylphosphine oxide as a stabilizer.

11. In a process for production of carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter, and a triarylphosphine oxide as a stabilizer.

12. In a process for production of carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter, and a trialkylarsine oxide as a stabilizer.

13. In a process for production of carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter, and a triarylarsine oxide as a stabilizer.

14. In a process for production of carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter, and trioctylphosphine oxide as a stabilizer.

15. In a process for production of carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of a iridium or rhodium compound, a halide promoter, and triphenylphosphine oxide as a stabilizer.

16. In a process for production of carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter, and a trialkylstibine oxide as a stabilizer.

17. A process as in claim 1 in which the stablizing component is an amine oxide $R_3NO$, where R is an alkyl radical of one to 18 carbon atoms.

18. Process as in claim 1 in which the ethylenically unsaturated hydrocarbon is ethylene and the product is propionic acid.

19. Process as in claim 1 in which the ethylenically unsaturated hydrocarbon is comprised of olefin having from three to eight carbon atoms and the product is comprised of carboxylic acids having from four to nine carbon atoms.

20. Process as in claim 1 in which the ethylenically unsaturated hydrocarbon is comprised of olefins having from nine to 19 carbon atoms and the product comprises carboxylic acids having from 10 to 20 carbon atoms.

* * * * *